United States Patent [19]

Holbek

[11] 4,287,142
[45] Sep. 1, 1981

[54] PROCESS FOR THE PRODUCTION OF MINERAL WOOL PRODUCTS

[75] Inventor: Kjeld Holbek, Lejre, Denmark

[73] Assignee: Rockwool International A/S, Hedehusene, Denmark

[21] Appl. No.: 952,732

[22] Filed: Oct. 19, 1978

Related U.S. Application Data

[63] Continuation of Ser. No. 811,829, Jun. 30, 1977, abandoned.

[30] Foreign Application Priority Data

Jul. 2, 1967 [DK] Denmark .............................. 3020/67

[51] Int. Cl.$^3$ .............................................. C04B 35/14
[52] U.S. Cl. ......................................... 264/37; 106/98; 264/176 F; 264/333
[58] Field of Search ..................... 264/333, 176 F, 37; 106/98

[56] References Cited

U.S. PATENT DOCUMENTS 2,527,766  10/1950  Rule ....................... 264/333
3,782,985  1/1974  Gebhardt ................ 106/98

FOREIGN PATENT DOCUMENTS 252109  8/1962  Australia ................ 264/333
205247  6/1961  Sweden ................... 264/333

*Primary Examiner*—John A. Parrish

[57] ABSTRACT

A process for the production of mineral wool products comprising admixing fine starting materials, a hydraulic binder, and an inorganic material containing at least 75% $SiO_2$ and having an average particle size of less than 100 $\mu$m to form a mouldable mixture, moulding the mixture to form briquettes, heating the briquettes to a temperature sufficiently high to form a melt and converting the melt thus formed into a mineral wool product.

7 Claims, No Drawings

PROCESS FOR THE PRODUCTION OF MINERAL WOOL PRODUCTS

This is a continuation of application Ser. No. 811,829 filed June 30, 1977, abandoned.

BACKGROUND OF THE INVENTION

This invention relates to a process for the production of mineral wool products comprising admixing the starting materials in finely divided form and a hydraulic binder to form a mouldable mixture, moulding the mixture to form small bodies of a desired size (in the following referred to as briquettes), heating the briquettes to a temperature sufficiently high to form a melt and converting the melt thus formed into a mineral wool product.

The specification of Swedish Pat. No. 205.247 discloses a process of the above mentioned type and comprises the use of Portland cement, clay or water glass as hydraulic binder to form the briquettes. However, it has been found that when using such briquettes, the melting conditions in furnaces which ordinarily are used in the production of mineral wool products are not fully satisfactory. This is due to the fact that the compressive strength of such briquettes decrease significantly when the temperature of such briquettes is raised to above about 500° C. Therefore, the briquettes tend to disintegrate and be converted into powder or dust at high furnace temperatures. The presence of such fine materials in the furnace adversely affects the melting process because it counteracts the desired flow of air and flue gases through the furnace. Thus, the presence of these fine materials results in the formation of a large pool of melt having a high temperature whereas it is desired to effect a gradual melting of the surfaces of the briquettes so as to allow a continuous supply of air and a continuous discharge of flue gases.

The object of the invention is to improve the melting conditions by a process of the type described above.

SUMMARY OF THE INVENTION

The process of the invention is characterized in introducing into the mixture of fine starting materials and hydraulic binder a fine inorganic material containing at least 75% $SiO_2$ and having an average particle size of less than 100 $\mu$m.

The introduction of a fine material having a high $SiO_2$ content into the mixture to be converted into briquettes presents the surprising advantageous effect that during the heating of the briquettes, $SiO_2$ reacts with the starting materials and that this reaction which causes the briquettes to maintain their form at temperatures, i.e. at 500° C. or above, at which the effect of the hydraulic binder has significantly decreased. Thus, by using an additive as defined above, the briquettes maintain their form until an initial melting of the surfaces of the briquettes starts.

Thus, the desired flow of gases through the furnace can be maintained and a relatively short melting zone is obtained.

The fine $SiO_2$-containing material may be a commercially available almost pure $SiO_2$ powder which is sold under the trade names "Cab-O-Sil" and "Aerosil" (registered trade marks). Another suitable $SiO_2$-containing material is fly ash and in particular fly ash obtained in the production of ferro silicon. The $SiO_2$ content of such fly ash is ordinarily above 90%.

As mentioned above, the average particle size of the $SiO_2$-containing material should be less than 100 $\mu$m, preferably less than 50 $\mu$m and most preferable less than 1 $\mu$m, because only such fine particles have a sufficiently high reactivity to react with the remaining components of the briquettes to prevent these briquettes from disintegrating at the temperatures at which the effect of the hydraulic binder starts decreasing.

The $SiO_2$-containing material is preferably used in an amount of up to about 30% by weight of the dry weight of all components of the briquettes. When the $SiO_2$-containing material is used in admixture with Portland cement, it is ordinarily sufficient to use about 5% $SiO_2$-containing material.

The process of the invention also presents the advantage that it has permitted a more economical production of mineral wool and has solved a serious environmental problem.

In the production of mineral wool large amounts of waste products are formed. These waste products which correspond to 25-30% of the starting materials consist partly of furnace slag and partly of mineral wool and so-called pearls which are deposited on the bottom of the spinner chamber in which the melt is converted into fibres. The major part of these waste materials are relatively fine and consequently they cannot be recycled to the furnace without causing the problems discussed above. However, by admixing these waste materials with the starting materials, hydraulic binder and $SiO_2$-containing material, they can be introduced into the furnace in a form which does not adversely affect the melting process. Thus, the need of transporting these waste materials to places in which they can be stored in nature is eliminated.

Since the costs of transportation and storage of these waste materials are relatively high in many countries, the savings obtained by avoiding such transportation and storage are significant. Furthermore, the recycling of the waste materials to the melting furnace reduces the consumption of raw materials.

The process of the invention has also made it possible to use many starting materials which, due to their physical form, have been found unsuitable for use in the production of mineral wool products. Therefore, it is possible to avoid the traditional troublesome quarrying of minerals, such as diabase, by blasting and subsequent crushing and classification of such minerals to obtain suitable starting materials for use in the production of mineral wool.

Furthermore, the process of the invention permits the production of mineral wool products of varying compositions because the briquettes used as starting materials can be composed so as to fulfill virtually any need.

The recycling of waste products in the production of mineral wool products results in an iron deficiency because part of the iron contained in the starting materials is reduced in the melting furnace. This deficiency can be eliminated by adding to the mixture of starting materials an extra amount of iron to compensate for such reduction.

In a preferred embodiment of the process of the invention, the briquettes are produced by admixing the fine starting materials, the dry hydraulic binder, such as Portland cement, and the $SiO_2$-containing material and by subsequently adding water to the mixture thus formed.

The water-containing mixture is stirred and is then introduced into moulds which are vibrated and left to stand. After about 24 hours the briquettes formed can be removed from the moulds and after about 3 days they can be introduced into a melting furnace. At that time they have a compressive strength of about 60 kp/cm² which is considered to be sufficient.

The moulding of the briquettes can also be effected by pressing, rolling or extrusion.

The invention will now be described in further detail with reference to the following non-limiting example.

EXAMPLE

In order to determine the compressive strength of briquettes for use in the process of the invention and briquettes for use in the prior art process described above at different temperatures, a number of test briquettes having the dimensions 10·10·10 cm were prepared. The composition of these briquettes and their compressive strength after heating to various temperatures are set forth in the following table.

TABLE

|  |  | Sample No. | | | | |
| --- | --- | --- | --- | --- | --- | --- |
|  |  | 1 | 2 | 3 | 4 | 5 |
| Composition, % by weight | Mineral wool | 40 | 40 | 40 | 40 | 40 |
|  | Waste cement | 10 | 10 | 10 | 10 |  |
|  | Calcium silicate[1] |  |  | 10 |  |  |
|  | Ash from ferrosilicon production |  |  |  | 10 |  |
|  | Glass powder[2] |  |  |  | 10 |  |
|  | Gravel (0-4 mm) | 40 | 50 | 40 | 40 | 50 |
|  | Water glass[3] |  |  |  |  | 10 |
| Compressive strength, kp/cm², after 14 days storage and heat treatment at a temperature of | 20° C. | 102 | 81 | >150 | 23 | 53 |
|  | 500° C. | 74 | 93 | >150 | 20 | 38 |
|  | 700° C. | 59 | 44 | about 150 | 18 | 20 |
|  | 900° C. | 42 | 38 | about 125 | 20 | 13 |
|  | 1100° C. | 0 | 0 | 65 | 0 | 14 |

[1]Made from a mixture of lime and sand.
[2]Crushed glass wool.
[3]The briquettes were dried in a drying box and subsequently stored.

As will appear from the table, the strength properties of the briquettes for use in the process of the invention are clearly superior to those of the prior art briquettes.

The briquettes prepared from Sample No. 3 were molten at about 1500° C. and were converted into mineral wool in a mineral wool spinner.

The mineral wool obtained was of the same quality as mineral wool prepared without the use of briquettes.

I claim:

1. A process for the production of mineral wool products which comprises the steps of
   (1) mixing together the following components: a finely divided mineral-containing material, a hydraulic binder, an inorganic material containing at least 75% by weight of $SiO_2$ and being in the form of particles having an average size of less than 100 $\mu$m, and a waste material recycled from step (4),
   (2) moulding the mixed components of step (1) to form briquettes,
   (3) heating the briquettes of step (2) to a temperature sufficient to form a melt,
   (4) spinning the melt of step (3) to form mineral wool and a waste material mainly consisting of unfiberized particles of mineral wool, and
   (5) recycling said waste material of step (4) to the mixture of step (1).

2. The process of claim 1 wherein said inorganic material is in the form of particles having an average size of less than 50 $\mu$m.

3. The process of claim 1 wherein said inorganic material is in the form of particles having an average size of less than 1 $\mu$m.

4. The process of claim 1 wherein said inorganic material is fly ash.

5. The process of claim 1 wherein said inorganic material is present in said mixed components of step (1) in an amount of up to 30% by weight.

6. The process of claim 1 wherein said mineral-containing material is mineral wool.

7. The process of claim 1 wherein iron is added to the mixed components of step (1).

* * * * *